No. 751,274. PATENTED FEB. 2, 1904.
J. FERREL, DEC'D.
J. F. REYNOLDS, ADMINISTRATOR.
VEHICLE BRAKE.
APPLICATION FILED DEC. 27, 1902.
NO MODEL. 3 SHEETS—SHEET 1.
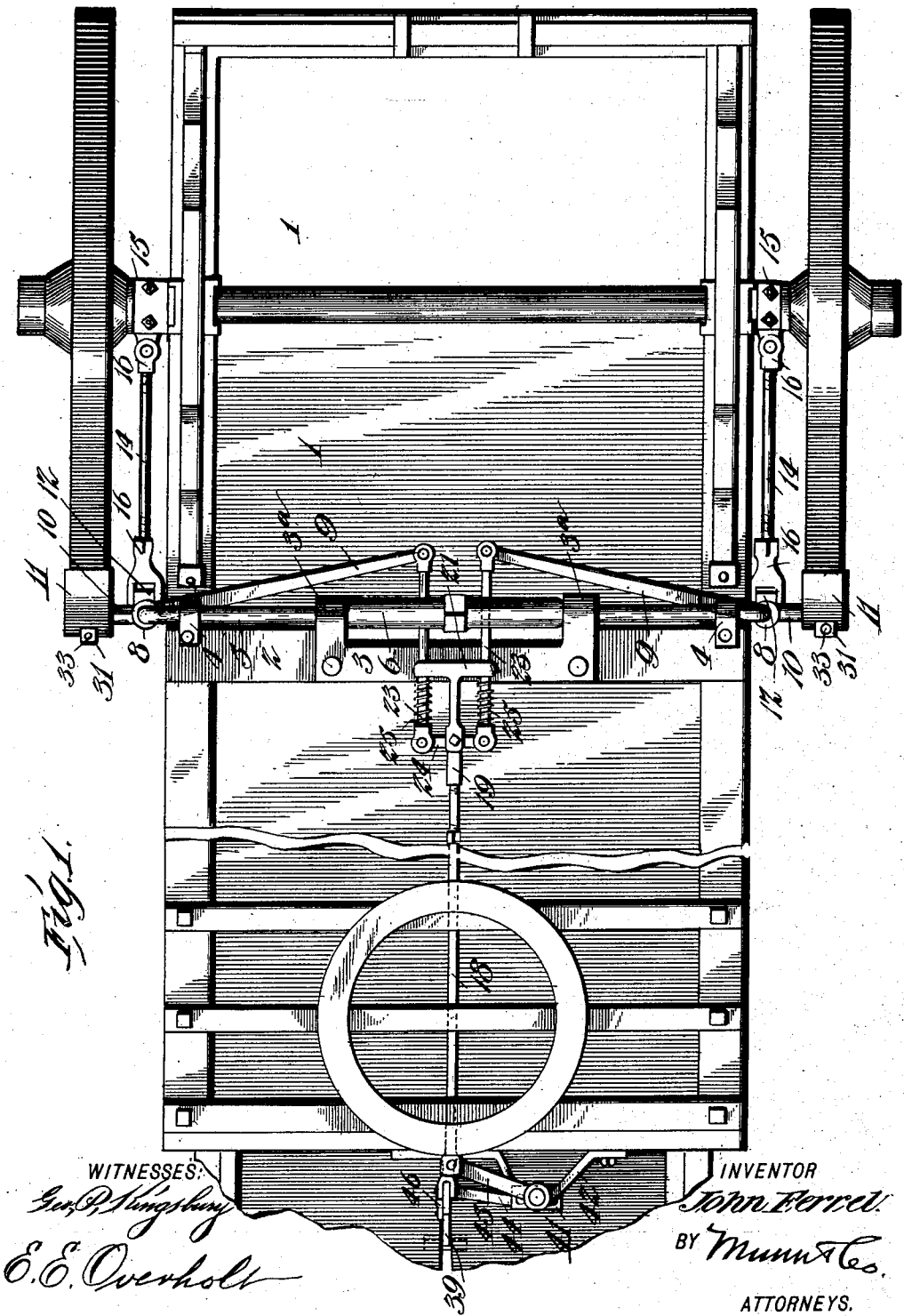
WITNESSES: INVENTOR
BY
ATTORNEYS.

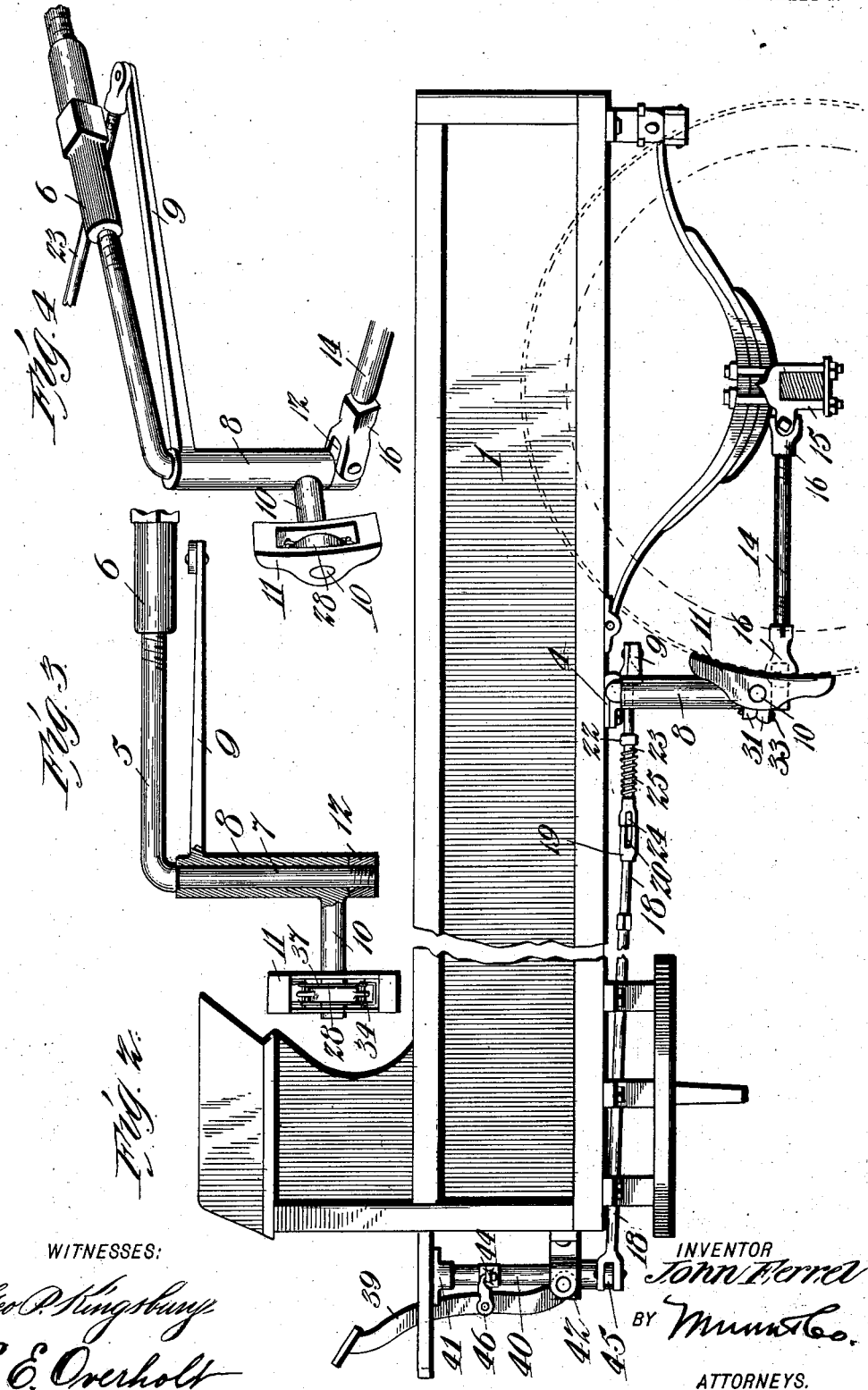

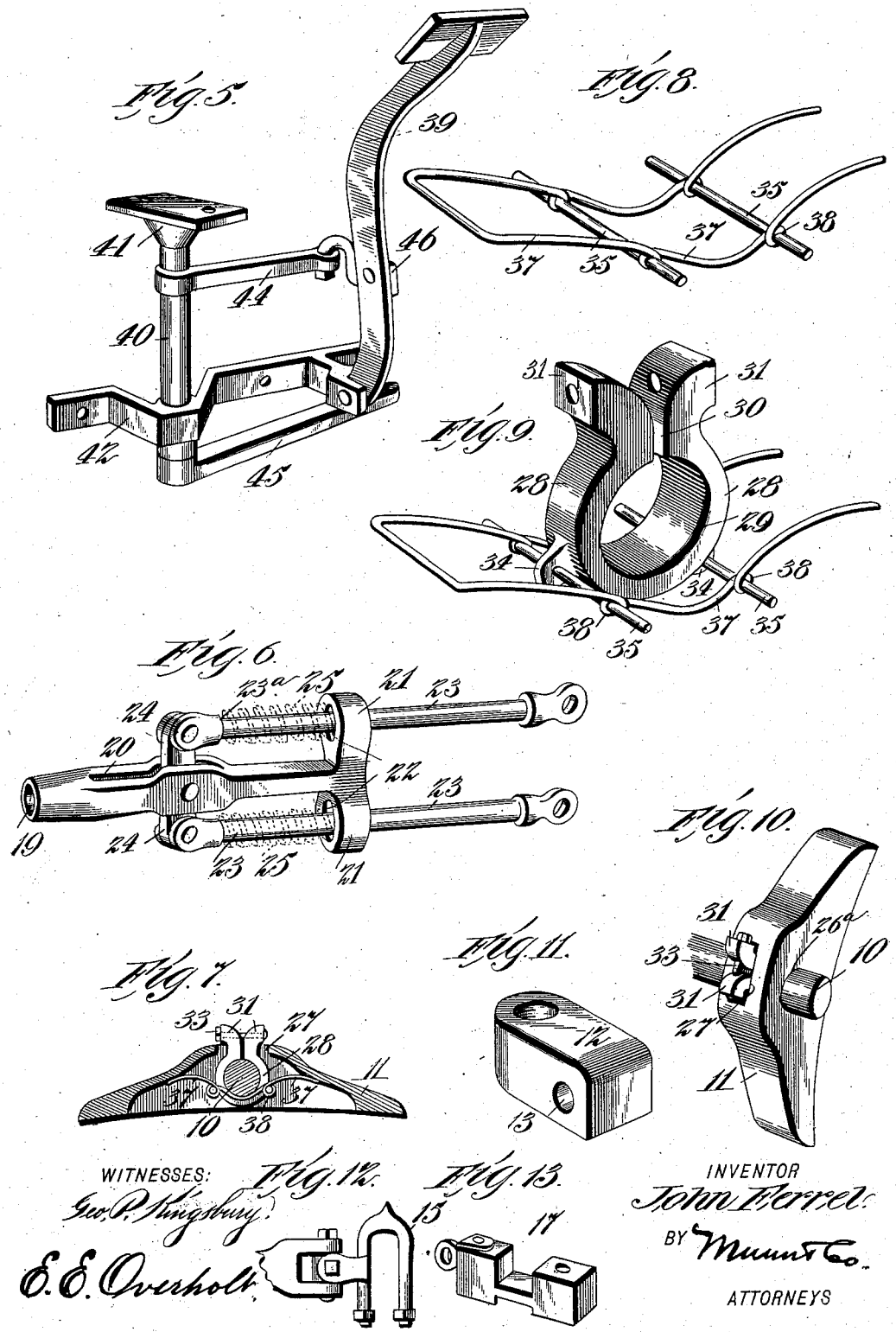

No. 751,274. Patented February 2, 1904.

UNITED STATES PATENT OFFICE.

JOHN FERREL, OF ZANESVILLE, OHIO; JOHN F. REYNOLDS ADMINISTRATOR OF SAID FERREL, DECEASED.

VEHICLE-BRAKE.

SPECIFICATION forming part of Letters Patent No. 751,274, dated February 2, 1904.

Application filed December 27, 1902. Serial No. 136,768. (No model.)

*To all whom it may concern:*

Be it known that I, JOHN FERREL, a citizen of the United States, residing at Zanesville, in the county of Muskingum and State of Ohio, have made certain new and useful Improvements in Vehicle-Brakes, of which the following is a specification.

My invention is specially adapted in some of its features for use on spring-vehicles, one of its objects being to hold the brake-shoes in invariable radial distances from the centers or axles of the wheels with which they coöperate irrespective of the position the body of the vehicle may occupy in relation to said axles by reason of the yielding of the springs due to variations in load, to jolts, &c.

A further object of my invention is to provide adjusting devices which will adapt the brake to be adjusted from time to time to compensate for wear, distortion, or strain upon any of its parts.

While my improved brake is specially adapted for use on spring-vehicles, it will yet be understood that it works equally well on vehicles not having springs.

My present invention is an improvement upon that for which I have received Letters Patent of the United States No. 646,641, and relates, first, to an equalizing device for equally distributing to the two brake-shoes the power applied by the brake-lever irrespective of the worn condition of either of said brake-shoes or of irregularities on the faces of the tires; secondly, to means whereby the power applied by the brake-shoes will be evenly delivered from all parts of the contacting faces of said shoes, thereby preventing said faces from wearing unequally, and, thirdly, to means for constantly holding the brake-shoes with their contacting faces disposed substantially parallel to the circumference of the wheels when not in use to prevent said blocks from tipping at their upper or lower ends into engagement with the wheels.

The peculiar construction, arrangement, and operation of the various parts of my invention are hereinafter described and the novel features pointed out and claimed, reference being had to the accompanying drawings, in which—

Figure 1 is a bottom plan view of a vehicle equipped with my improved brake. Fig. 2 is a side elevation of the body and rear axle of a vehicle with my improved brake device attached, the rear wheel of the vehicle being shown in dotted lines. Fig. 3 is a side elevation, partly in section, of a portion of my brake device. Fig. 4 is a perspective view of the same part. Fig. 5 is a perspective of the brake-lever and its connections at the front of the vehicle-body. Fig. 6 is a perspective view of the equalizing device constituting a part of my improvement. Fig. 7 is a longitudinal sectional view of one of the brake-shoes complete. Fig. 8 is a perspective view of the spring used therewith. Fig. 9 is a perspective view of the spring in operative position upon its supporting-clamp. Fig. 10 is a perspective view of one of the brake-shoes with the securing-clamp and supporting-arm in their operative relation thereto. Fig. 11 is a perspective of the transversely-apertured nut which connects the forward end of the fulcrum-rods with the lower end of the bearing 7. Fig. 12 shows a clip provided with a universal joint for connecting the fulcrum-rods of my device with the axle of the vehicle, and Fig. 13 shows a modified form of axle-clip.

Referring to Figs. 1 and 2, the numeral 1 designates a vehicle-body to which my device is attached. On the under side of the body just in front of the rear wheels of the vehicle is the transverse bar 2, by which my brake device is chiefly supported, said bar having at its center the keeper-plate 3 and near its outer ends the supporting-straps 4. The plate 3 is provided at its ends with rearwardly-extending portions 3ª, having suitable apertures at their ends to form bearings for the inner ends of the two sections of the transverse brake-supporting rod 5, the outer ends of said rod having bearings in the supporting-straps 4. The two sections of this rod 5 are united at their threaded inner ends by the turnbuckle 6. By this arrangement the rod 5 is adapted for application to vehicle-bodies of different widths. At their outer ends the two sections of the rods 5 (see Figs. 3 and 4) are bent downwardly substantially at right angles to their main portions, and these downwardly-extending portions 7 are slightly reduced in diameter with shoulders at their upper ends and form bearings for the rotatable sleeves 8. The extended lower ends of the bearings 7 are threaded to receive the nuts (illustrated in Fig. 11) for holding the sleeves in place. The sleeve 8 has at its upper end the inwardly-extending arm or lever 9 and at its lower end the outwardly-extending short arm 10. The upper arms 9 are pivotally connected at their inner ends with the connecting-rods of the equalizing device. The arms 10 at the lower end of the sleeves 8 carry the brake-shoes 11.

From Fig. 11 it will be seen that the nuts 12 on the lower end of the bearings 7 are each provided with a transverse aperture 13, through which passes a pivot to which is suitably connected the forward end of the adjustable fulcrum-rods 14, as illustrated in Figs. 2 and 4. These rods are provided with means whereby their length may be suitably adjusted to hold the brake-shoes in proper relation to wheels of varying diameters, which means having been described in my former patent need not be further referred to here except in reference to the axle-clip 15 and the means which I employ for forming a universal joint connection between the same and the turnbuckle-tube 16, as clearly illustrated in Fig. 12.

Instead of the device shown in Fig. 12 the means of connection illustrated in Fig. 13 may be substituted, if preferred. In that form the central transverse recess in the top of the clip-block 17 is designed to receive the axle of the vehicle at its under side and is secured to said axle by suitable bolts.

So far as the operation of my device is concerned the arms 9 and 10 may be considered as one continuous arm or lever, with the sleeve 8 forming the fulcrum therefor. It will be seen from Fig. 1 that when a forward pull is given to the arms 9 the brake-shoes will be brought into engagement with the rear wheels of the vehicle, and from Fig. 2 it is apparent that whatever position the body of the vehicle may assume by reason of its load or its up-and-down movement due to the action of the springs the fulcrum-bars 14 will always hold the brake-shoes equally distant from the centers of the wheels.

To cause the force of the pull upon the draw-bar 18 to be equally distributed to the two brake-shoes irrespective of the fact that one may be worn more than the other, I interpose between the said draw-bar and the inner ends of the lever-arms 9 the equalizing device, (illustrated in Fig. 6,) which consists of a T-shaped bar having a threaded socket portion 19 at its front end and having a horizontal elongated slot 20 near the center of the main stern of the T. The cross-bar 21 of the T is also provided at each end with a slot 22, which slots are in the same plane with the slot 20 and extend from near the ends of the cross-bar 21 inwardly a sufficient distance to easily receive the parallel pull-bars or connecting-rods 23 and to allow them to have considerable lateral play therein. The transverse equalizing-bar 24 is loosely pivoted at its center in the longitudinal slot 20 of the T-shaped bar, and to the ends of this bar 24 are pivotally connected the forward ends of the parallel connecting-rods 23. It will be seen from Fig. 1 that the force of a forward pull on the draw-bar 18 will be equally distributed to the parallel rods 23 and through them to the brake-shoes, causing said shoes to pull one against the other, as it were, so that each one will be held with equal pressure against its wheel however much more one may chance to be worn than the other. The elongation of the slots 22 in the T-head 21 will permit the rear ends of the parallel rods to move slightly to or from each other, as the movements of the inner ends of the arms or levers 9 may require, and the elongation of the slot 20 will permit the equalizing-bar 24 to oscillate to compensate for unequal wear in either of the brake-shoes or for any lack of adjustment of the fulcrum-rods or other parts of the brake or from irregularities on the faces of the tires or from the unequal spring or yielding of any of the operating levers or bars of the brake. However, it is not only necessary that the brakes should be always drawn with equal force against the wheels of the vehicle, but it is also necessary that when removed therefrom they should be held substantially at equal distances from the wheels, and to accomplish this result I place the compression-springs 25 around the parallel rods 23 between the T-head 21 and the shoulders 23ª of the connecting-sockets at the inner ends of said parallel bars. These springs having equal resistance will normally hold the equalizing-bar parallel with the cross-bar 21, which through the connections already described will produce the result sought.

In Figs. 7 and 10 I have illustrated the means I employ to conveniently and reliably secure my brake-shoes to their supporting-arms and to hold each of said shoes so that its face will bear against the wheel with equal pressure at all points on its contacting surface and so that said contacting surface when out of engagement with the wheel will be held always parallel to the portion of the tire adjacent to it, so that the top or bottom of the shoe cannot tip toward the wheel. Each brake-shoe 11 has a large central recess on its inner or bearing side, which terminates in a central opening 27 at the outside or back of the shoe. The shoe is further provided with the transverse bore 26ª through its sides, into which bore the shoe-supporting arm 10 is easily received. The brake is held against lateral movement on the arm 10 by the securing-clamp 28, (illustrated in Figs. 7 and 9,) said clamp being provided with the central opening 29, the split 30 leading from the top of the clamp into said opening and forming said top into opposing jaws, the enlarged portions 31 at opposite sides of said split having their inner and outer sides flat and parallel and provided with alined bores to receive an adjusting-bolt 33. The lower portion of the clamp is provided with apertured lugs 34, holding the parallel pins 35, which carry the wire spring 37. When it is desired to place the brake-shoes in operative position upon their supporting-arms 9, the clamps 28 are placed inside said shoes, as shown in Figs. 7 and 10, with their jaws 31 projecting outwardly through the openings 27 on the backs of the shoes sufficiently to give access to the adjusting-bolts 33. The shoes are then slipped over the ends of the supporting-arms 9, with said arms extending through their bores 26ª and the openings 29 of the inclosed clamps 28. The shoes are then moved into proper relative position to the wheels of the vehicle, and the nuts on the bolts 33 are tightened up, which latter operation causes the clamps 28 to rigidly engage the arms 10, and thereby holds the shoes against any movement longitudinal of said arms. The function of the springs 37, before referred to, is to hold the brakes so that their ends shall not tip toward the wheels when they are out of use. The bolts or pins 35 extend from either side of the clamps about a sufficient distance to contact with the side walls of the brake-shoes. The springs 37 are provided with the coils 38, through which the pins 35 pass, and said springs are thereby held on the clips 28 with their ends bearing outwardly against the back walls of the brake-shoes, as illustrated in Fig. 7. By this arrangement it will be seen that the shoes are yieldingly held against rotatable movement on their supporting-arms 10 in the position to which they may be adjusted before the clip 28 is clamped upon said arms.

The mechanism employed in direct connection with the operating-lever 39 of my device to communicate power to the draw-bar 18 is illustrated in Fig. 5. This mechanism is preferably located on the outside of the vehicle-body, at the front end thereof and immediately beneath the foot-board, and consists of the vertical lever-bar or rock-shaft 40, having bearings in the brackets 41 and 42. The lower arm 45 is pivoted to the forward end of the draw-bar 18. The upper arm 44 is connected by a link 46 to the brake-operating foot-lever near its center. The latter is fulcrumed at its lower end on the bracket 42, and its upper end is in convenient proximity to the driver's seat. It is obvious that by an outward movement of the upper end of the foot-lever 39 the brake mechanism is operated and the brake applied to the wheels.

Having thus fully described my invention, what I claim as new, and desire to secure by Letters Patent, is—

1. In brake devices for vehicles, an equalizing device adapted to be interposed between the brakes and the power end of the brake mechanism, said device comprising a T-shaped bar having openings in its main stem and cross-bar, a socket at its end opposite the cross-bar, for connection with the power end of the brake mechanism, an equalizing-bar pivoted in the opening in the main stem of the T-shaped bar, connecting-rods pivoted at one end to the ends of the equalizing-bar and extending through the openings in the T-head and provided at their other ends with means for connection with the brake-shoes and a coiled compression-spring around each of said connecting-rods between the equalizing-bar and the said T-head, as set forth.

2. In brake devices for vehicles, an equalizing device adapted to be interposed between the brakes and the power end of the brake mechanism, said device comprising a T-shaped bar adapted to be disposed horizontally, said bar having horizontal openings in its main stem and cross-bar, a socket at its end opposite the cross-bar for connection with the power end of the brake mechanism, an equalizing-bar pivoted in the opening in the main stem of the T-shaped bar, connecting-rods pivoted at one end to the ends of the equalizing-bar and extending through the openings in the T-head and provided at their other ends with means for connection with the brake-shoes, the distance of the openings of the T-head from each other and from the main stem being the same as the distance of the pivot-points of the equalizing-bar from the main stem and from each other, whereby said T-head constitutes a central support for the connecting-rods holding them always substantially parallel with each other, and a compression-spring coiled around each of said connecting-rods between the equalizing-bar and the T-head, whereby said T-head constitutes a point of purchase against which said springs act as set forth.

3. In vehicle-brakes the combination with brake-shoes of a draw-bar and mechanism connecting it with said shoes, of a rock-shaft, an upper and a lower arm both extending in the same direction from said shaft, the lower arm at its outer end engaging said draw-bar, a journal on the upper end of said rock-shaft, a bearing secured underneath the footboard of the wagon-body into which bearing said journal is received, a bracket near the lower end of said shaft and above the lower arm thereof, in which bracket the lower end of said shaft has bearing, said bracket having one end extended in the direction of said arms and about equidistant therewith, an integral standard projecting outwardly from said extended end of the bracket, said standard being forked at its outer end, a power-lever pivoted at its lower end in said forked projection and extending upwardly past said upper arm, and a link connecting said lever with said upper arm, whereby to operate said brake mechanism through said lever substantially as specified and for the purpose set forth.

JOHN FERREL.

Witnesses:
   JOHN E. EVANS,
   NEAL D. CRUMBAKER.